(12) United States Patent
Motta

(10) Patent No.: US 6,980,239 B1
(45) Date of Patent: Dec. 27, 2005

(54) IMAGING SYSTEM WITH MULTIPLE BOOT OPTIONS

(75) Inventor: Ricardo J. Motta, Palo Alto, CA (US)

(73) Assignee: Pixim, Inc., Mountain View, CA (US)

( * ) Notice: Subject to any disclaimer, the term of this patent is extended or adjusted under 35 U.S.C. 154(b) by 881 days.

(21) Appl. No.: 10/001,593

(22) Filed: Oct. 19, 2001

(51) Int. Cl.[7] ................ H04N 5/232; H04N 5/76; H04N 5/225; H01L 27/00
(52) U.S. Cl. ................ 348/211.6; 348/231.6; 348/374; 250/208.1
(58) Field of Search ............ 348/207.1, 211.99, 348/211.6, 211.4, 231.3, 231.9, 374; 250/208.1

(56) References Cited

U.S. PATENT DOCUMENTS

| | | | |
|---|---|---|---|
| 5,477,264 A * | 12/1995 | Sarbadhikari et al. ... | 348/231.6 |
| 5,883,830 A * | 3/1999 | Hirt et al. ............... | 348/294 |
| 6,094,221 A | 7/2000 | Andersion | |
| 6,177,957 B1 * | 1/2001 | Anderson ............... | 348/231.99 |
| 6,293,465 B1 * | 9/2001 | Heller et al. ............ | 235/454 |
| 6,396,539 B1 * | 5/2002 | Heller et al. ............ | 348/246 |
| 6,721,008 B2 * | 4/2004 | Lee et al. ............... | 348/302 |
| 6,726,103 B1 * | 4/2004 | Motta et al. ............ | 235/454 |
| 6,778,212 B1 * | 8/2004 | Deng et al. ............. | 250/208.1 |
| 6,879,340 B1 * | 4/2005 | Chevallier ............... | 348/231.9 |
| 2002/0145669 A1 * | 10/2002 | Umeda et al. ........... | 348/302 |
| 2003/0151680 A1 * | 8/2003 | McDermott et al. ..... | 348/231.6 |

FOREIGN PATENT DOCUMENTS

| | | | | |
|---|---|---|---|---|
| JP | 10322513 A | * | 12/1998 | .......... H04N 1/028 |

OTHER PUBLICATIONS

Fossum, "CMOS Image Sensors: Electronic Camera-on-a-Chip"; Oct. 1997; IEEE Transactions on Electron Devices; vol. 44, No. 10; pp. 1689-1698.*

Fossum; "Digital Camera System on a Chip"; May-Jun. 1998; IEEE Micro.*

* cited by examiner

Primary Examiner—Ngoc-Yen Vu
Assistant Examiner—John M. Villecco
(74) Attorney, Agent, or Firm—Steve Mendelsohn; Yuri Gruzdkov; Carmen Cook

(57) ABSTRACT

An imaging system with multiple boot options and preferably implemented as an integrated system-on-a-chip (SOC) imaging system. According to the present invention, an imaging system can be operated in one or more operating modes enabled in a number of ways. The imaging system can boot using one or more configurations stored either internally or externally, wherein a user can select a mode of operation or configure the imaging system for different applications. Consequently, multiple applications and, thus, market segments can be served by essentially the same hardware, while application-specific customization can be achieved by configuring the system from a plurality of boot options according to the intended application. In addition, the present invention enables loading new software, adding a new capability, such as interfacing with a new type of device, or implementing a special troubleshooting operating mode for maintenance and diagnostics. This simplifies development of imaging systems and can result in more efficient product support.

18 Claims, 4 Drawing Sheets

100

IMAGING SYSTEM WITH MULTIPLE BOOT OPTIONS

BACKGROUND OF THE INVENTION

1. Field of the Invention

The present invention relates to the field of image sensors and imaging systems.

2. Description of the Related Art

Imaging systems, such as digital cameras, are used for still photography and video recording. The images captured by such systems may be used for viewing and/or further processing in a variety of representations, such as electronic, digital, or printed. A typical imaging system is built from a multiplicity of individual components that are integrated into a functional system.

FIG. 1 shows a schematic block diagram of an imaging system 100 of the prior art. System 100 has an electronic image sensor 102 that receives light through an optical interface 104. The optical interface may comprise a lens system, an aperture mechanism, and/or a light filter. Settings of the optical interface, e.g., zoom and aperture size, can be mechanically adjusted according to the user input using a motor 106.

The sensor may be implemented as a charge coupled device (CCD) or an array of complementary metal oxide semiconductor (CMOS) photosensitive circuits that generate electrical signals in response to the incident light. Analog signals from the sensor are converted by an analog-to-digital converter (ADC) 108 into digital image data and transferred for storage and/or further processing into a random access memory (RAM) 110. The data may be processed by a programmed processor 112 using algorithms stored in a read-only memory (ROM) 114. The processed image data may then be stored back to RAM 110 within system 100 and/or transferred to an external system, such as a personal computer, through interface 116 for storage as an electronic file and/or for further graphical and image processing, e.g., to enhance the image or for use with graphics software. The electronic components of system 100, such as sensor 102, ADC 108, memories 110 and 114, processor 112, and interface 116, are typically configured on a printed circuit board (PCB) 118.

Imaging systems, such as system 100, enable a user to manipulate mechanical buttons, knobs, toggle switches, etc., to select a few settings, most commonly, of the optical interface. However, many of the system features are often based on system software executed by processor 112. Suppliers of imaging systems, such as system 100 of FIG. 1, load the software into ROM 114 and select software-based feature settings for their imaging systems. Because cost-effective on-chip ROM is often made by the process of photomicrolithography and becomes a permanent part of the circuit design, such ROM cannot be modified once the product design is finished. This lack of flexibility of on-chip ROM makes it impossible to correct defects found later in the software, to add new features, or to use the imaging system for new purposes.

SUMMARY OF THE INVENTION

Embodiments of the present invention provide a system and method for enabling a user to select a mode of operation, add imaging system features, update software, and allow customization of the imaging system for different applications. In one embodiment, the present invention is an integrated system-on-a-chip (SOC) imaging system with multiple boot options. The imaging system can boot using one or more configurations stored either internally or externally, wherein a mode of operation can be selected or the imaging system can be configured for different applications. Consequently, multiple market segments can be served by essentially the same hardware, while local customization can be achieved by configuring the imaging system from a plurality of available boot options according to the intended application. In addition, according to embodiments of the present invention, an imaging system allows users to load new software, add a new capability, such as interfacing with a new type of device, or implement a troubleshooting operating mode for maintenance and diagnostics. This simplifies development of imaging systems and can result in more efficient product support.

According to one embodiment, the present invention is an imaging system comprising an image sensor, a memory, and a processor, wherein the image sensor is configured to generate image signals corresponding to an image of a scene; the processor is configured to control operations of the imaging system in one or more operating modes enabled by one or more configurations accessible by the processor; and the memory is configured to store the one or more configurations accessed by the processor to control the operations of the imaging system.

According to another embodiment, the present invention is a method of operating an imaging system, the imaging system comprising an image sensor, a memory, a processor, and interface pins, the method comprising the steps of (1) applying a voltage pattern to the interface pins; and (2) accessing a configuration corresponding to the voltage pattern, wherein the image sensor is configured to generate image signals corresponding to an image of a scene; the processor is configured to control operations of the imaging system in one or more operating modes, wherein the accessed configuration enables at least one of the operating modes; and the memory is configured to store one or more configurations accessible by the processor.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. The description herein is largely based on a particular imaging system based on CMOS technology and system-on-a-chip (SOC) imaging system architecture. Those skilled in the art can appreciate that the description can be equally applied to other imaging systems.

Figure 1:
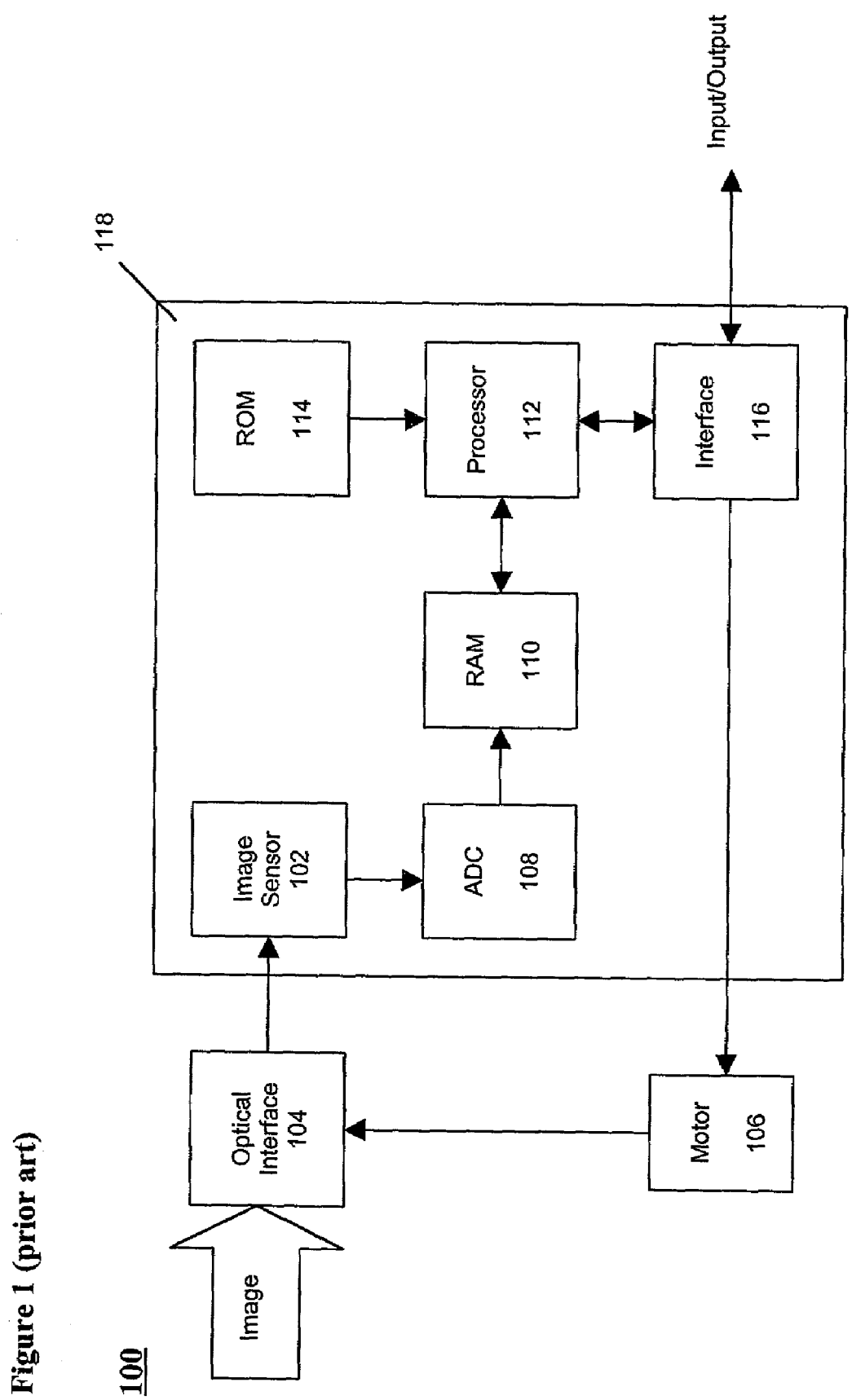
FIG. 1 is a schematic block diagram of an imaging system of the prior art.
Figure 2:
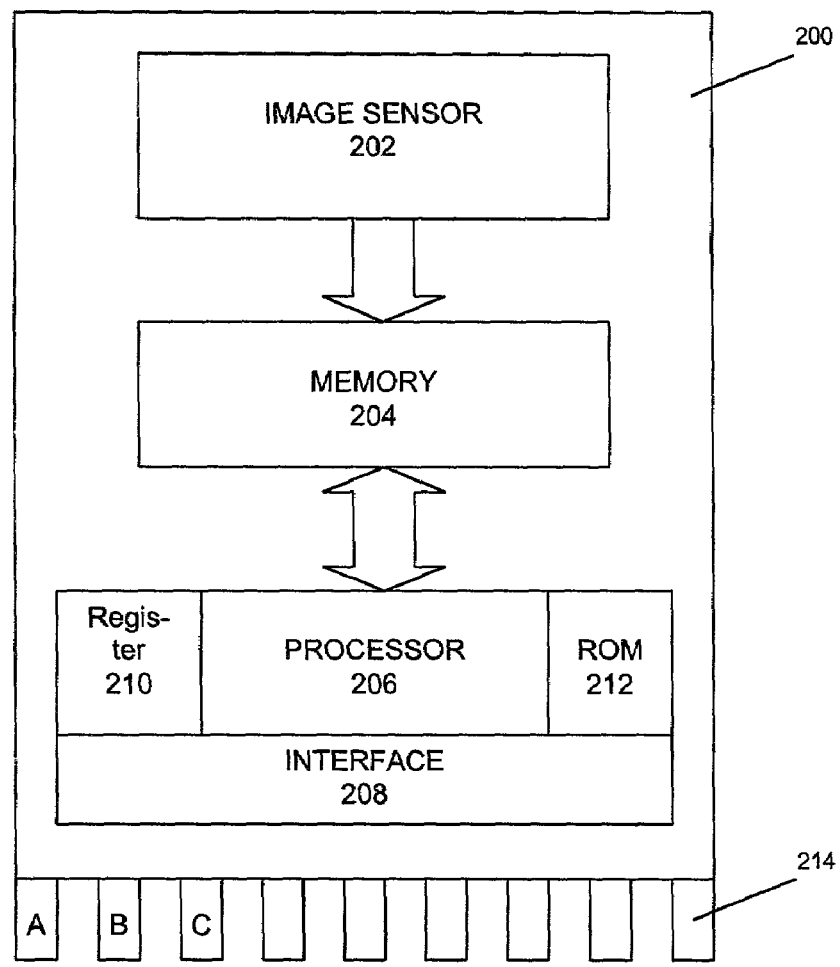
FIG. 2 shows a schematic block diagram of an imaging system according to one embodiment of the present invention.

FIG. 2 shows a schematic block diagram of an imaging system 200 according to one embodiment of the present invention. System 200 comprises a digital image sensor 202, an on-chip memory 204, a processor 206, an interface 208, a register 210, and a read-only memory (ROM) 212, preferably all integrated on a single chip as an SOC. System 200 further comprises interface pins 214. Sensor 202 is configured to generate image data in response to incident light and transfer the data to memory 204. One particular implementation of an image sensor, such as sensor 202, is a digital pixel sensor described in U.S. Pat. No. 5,461,425 (Fowler et al.), the teachings of which are incorporated herein by reference.

Processor 206 is configured to access and process the data stored in the memory. Data processing may include but is not limited to data interpolation, noise reduction, color adjustment, and/or geometric corrections due to optical aberrations. Processor 206 is further configured to interpret and execute external commands received through pins 214 and interface 208. Register 210 is configured to store addresses of operating routines and/or sets of configuration parameters. ROM 212 is configured to store (a) internal bootable software comprising one or more operating routines and possibly (b) additional sets of configuration parameters. To enable a particular operating mode for system 200, the corresponding set of configuration parameters and the corresponding operating routine are loaded by processor 206 from register 210 and ROM 212, respectively. A set of configuration parameters and an operating routine are collectively referred to as a configuration. Changing a configuration involves changing either the set of configuration parameters or the operating routine, or both.

Figure 3:
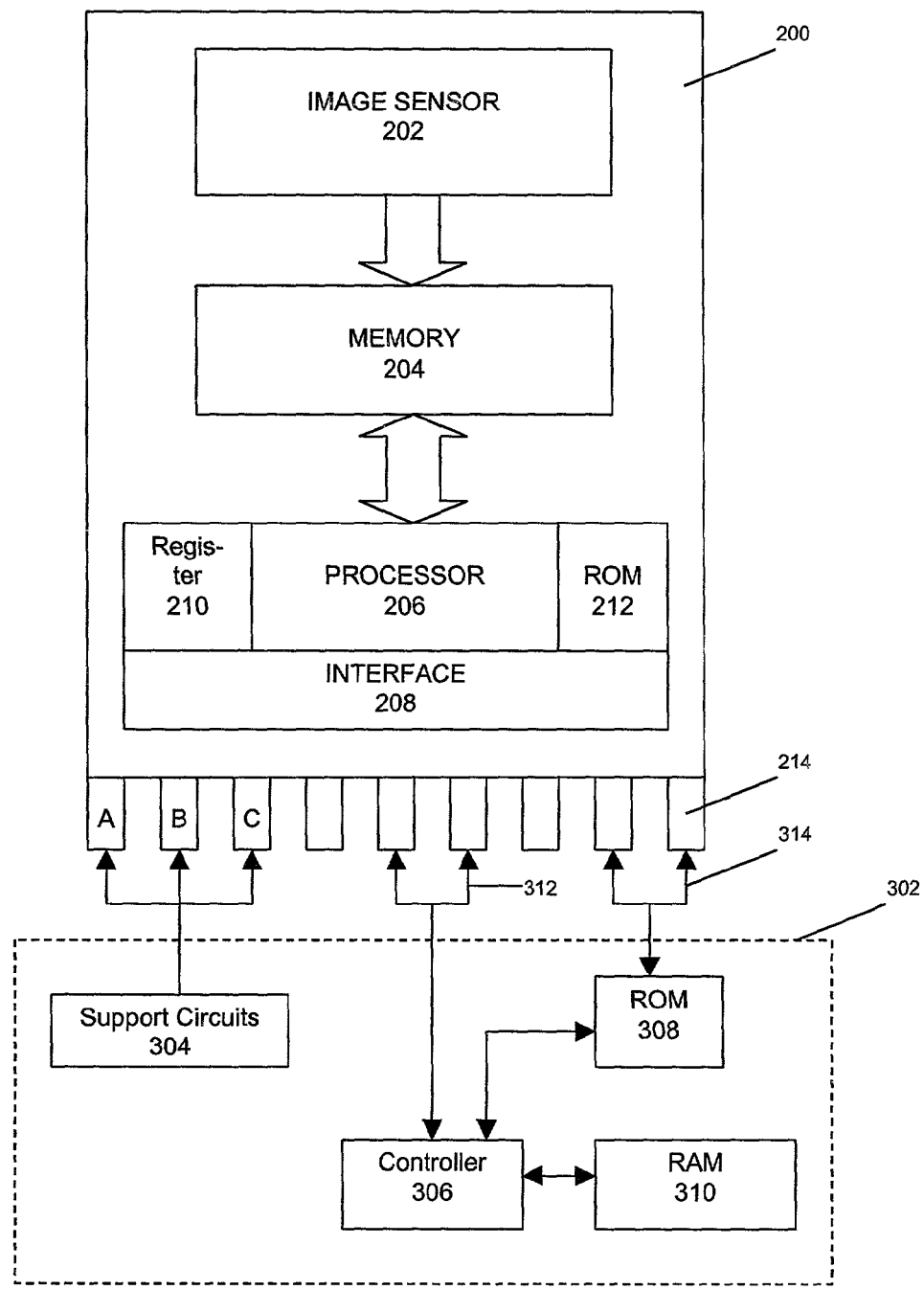
FIG. 3 shows a schematic block diagram of the imaging system of FIG. 2 and a platform enabling external boot options for the imaging system and a capability to load new software according to another embodiment of the present invention.

FIG. 3 shows a schematic block diagram of imaging system 200 of FIG. 2 configured with a platform 302 enabling processor 206 of system 200 to access different configurations stored internally in system 200 and, also, configurations in addition to or instead of the configurations stored internally, according to one implementation of the present invention. Platform 302 comprises support circuits 304, an optional controller 306, and optional memories 308 and 310. Memories 308 and 310 can be a ROM and a RAM, respectively. Circuits 304 can be configured to supply power and generate logical inputs and/or clock signals for system 200, which are delivered via pins 214. Controller 306 is configured to access ROM 308 and RAM 310. Controller 306 can also be configured to communicate with system 200 using an interface of choice, e.g., a bidirectional two-wire serial interface 312. ROM 308, which can be directly accessed by system 200 via interface 314, can be configured to store additional operating routines and/or additional sets of configuration parameters enabling additional operating modes for system 200.

Platform 302 can be configured to support several boot options for system 200, for example, as follows:
  (I) Load a configuration stored internally in system 200, which configuration is chosen based on the logical inputs supplied by circuits 304;
  (II) Load a configuration from ROM 308;
  (III) Load a configuration from ROM 308 via controller 306; and
  (IV) Load a configuration from RAM 310 via controller 306.

Depending on the particular configuration of platform 302, different combinations of options I–IV may be available. For example, if controller 306, ROM 308, and RAM 310 are not present, then only option I is available. Similarly, if controller 306 and RAM 310 are not present, then only options I and II are available. Furthermore, if RAM 310 is not present, then only options I–III are available. Different embodiments of the present invention may utilize different configurations for platform 302 and, therefore, have different combinations of boot options.

Figure 4:
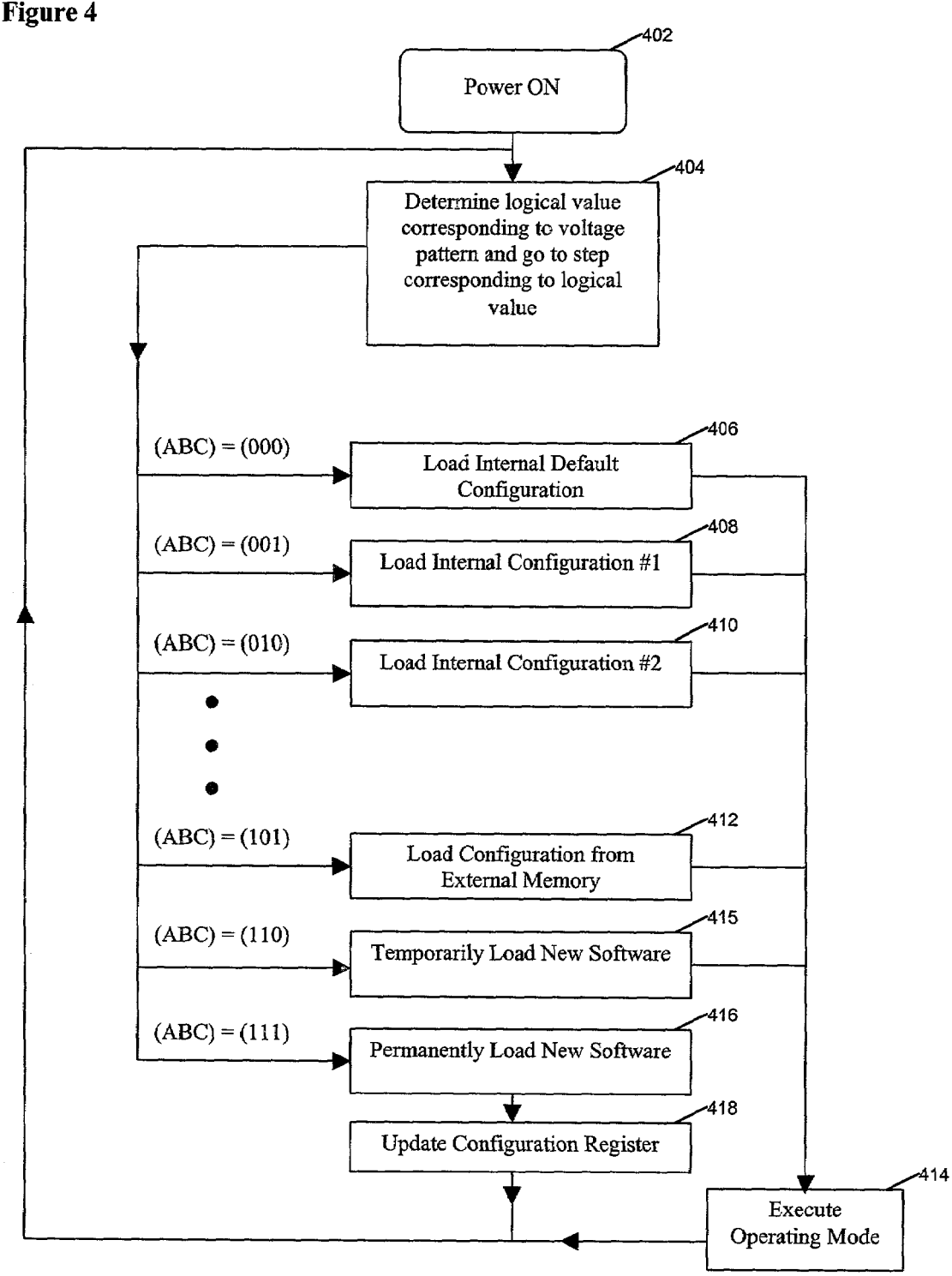
FIG. 4 is a flowchart illustrating a method of operation of the imaging system of FIG. 2 and the imaging system and platform of FIG. 3.

FIG. 4 shows a flowchart illustrating how system 200 can be booted and operated, with the option of using platform 302, according to one embodiment of the present invention. After the power is turned on, in step 402, the system prepares itself to boot. In step 404, the system receives and interprets a boot option signal. The boot option signal can be implemented by a variety of methods, such as supplying a voltage pattern of logical "0" and/or logical "1" values to one or more pins 214 of system 200. For example, three pins 214 marked as A, B, and C in system 200 of FIGS. 2 and 3 can be used to indicate a total of eight different boot options. This particular implementation is further illustrated in FIG. 4.

In a preferred embodiment, the absence of voltage on pins A–C is interpreted as logical (000) and a configuration designated as "default" is loaded from register 210 and/or ROM 212 during step 406 to enable a "default" operating mode. If a different voltage pattern is supplied to pins A–C, then system 200 proceeds to a selected step of steps 408–412 to execute the corresponding boot option. If a particular voltage pattern is undefined, system 200 preferably loads the internal default configuration. In one embodiment shown in FIG. 4, the different boot options are as follows:
  (i) If the voltage pattern supplied to pins A–C corresponds to the logical value of (001), then Configuration #1 is loaded from register 210 and/or ROM 212 in step 408;
  (ii) If the voltage pattern supplied to pins A–C corresponds to the logical value of (010), then Configuration #2 is loaded from register 210 and/or ROM 212 in step 410; and
  (iii) If the voltage pattern supplied to pins A–C corresponds to the logical value of (101), then the configuration is loaded from an external memory, e.g., ROM 308 or RAM 310, in step 412.

After the appropriate configuration has been loaded, imaging system 200 proceeds to step 414 to execute an operating mode corresponding to the loaded configuration. The operating mode can be changed by applying a different voltage pattern to pins A–C at step 404 to cause a different configuration to be loaded. If system 200 is a digital camera, then an example of four operating modes might be still camera mode, camera mode with different pin assignments, bar-code reading mode, and diagnostic mode.

Steps 415, 416, and 418 illustrate a capability to load new software into system 200 using platform 302. New software can be either permanently or only temporarily used in place of the already existing, internally stored software and/or be appended to it. In one embodiment, if a voltage pattern supplied to pins A–C corresponds to the logical value of (110), then system 200 will proceed to step 415 to temporarily load new software from platform 302. In step 415, system 200 communicates with controller 306. Controller 306 configures system 200 to receive new software that can be a new operating routine and/or a new set of configuration parameters. Controller 306 transfers new software and/or new sets of configuration parameters from RAM 310 or ROM 308 of platform 302 to system 200. This new software and/or new sets of configuration parameters may then be used in step 414 to execute an operating mode corresponding to the new configuration enabled by the new software and/or configuration parameters.

In one embodiment, if a voltage pattern supplied to pins A–C corresponds to the logical value of (111), then system 200 will proceed to step 416 to permanently load new software from platform 302. To enable the transfer and permanent storage of new software in system 200, register 210 and/or ROM 212 can be implemented using a programmable ROM, electrically-erasable programmable ROM, flash memory, or any other suitable memory device. After the new software has been transferred to system 200, register 210 is updated in step 418. During step 418, one or more addresses may be removed from register 210 to disable one or more old operating routines when a new address corresponding to a new operating routine is added. After the completion of step 418, system 200 can be configured to execute the new operating mode by applying the corresponding voltage pattern to pins A–C at step 404 to cause the new configuration to be loaded.

Other possible boot options corresponding to the logical values of (011) and (100) and not shown in the flowchart of FIG. 4 may be used for loading additional configurations stored either internally in system 200 or externally in platform 302. In addition, some of the boot options corresponding to these logical values may be reserved for future configuration upgrades to enable new operating modes. In general, depending on the particular embodiment, a different number of boot options may be implemented. For example, if two or four pins 214 of system 200 are configured for selecting boot options, then a total of four or sixteen different boot options, respectively, can be implemented.

As is clear from the above description, system 200 can operate in one or more operating modes, which can be enabled in a number of ways:

(1) the imaging system can boot using one or more configurations stored internally;
(2) the imaging system can boot using a configuration stored externally; and
(3) the internal software that enables one or more operating modes can be upgraded or extended to modify an already existing operating mode or to add a new operating mode.

The present invention allows a user to select a mode of operation or configure an imaging system for different applications, which increases versatility of imaging systems. Consequently, multiple applications can be enabled by essentially the same hardware while application-specific customization can be achieved by configuring an imaging system from a plurality of boot options according to the intended application. For example, the supplier of SOC imaging system of the present invention can fabricate a single design that can be software configured for different applications, such as video camera and still image camera.

In addition, the present invention enables loading new software or adding a new capability, e.g., interfacing with a new type of device. Also, special troubleshooting operating modes can be implemented for maintenance and diagnostics. The latter can result in more efficient product support as maintenance or troubleshooting instructions can be provided by the supplier remotely based on the results generated by the imaging system during the troubleshooting operating mode.

In general, the present invention may be implemented for imaging systems having image sensors with one or more pixels arranged in either a one- or two-dimensional pattern, such as an array of pixels arranged in rows and columns. Photoelements in each pixel may be based on any suitable light-sensitive device, such as, for example, a photodiode, a phototransistor, a photogate, photo-conductor, a charge-coupled device, a charge-transfer device, or a charge-injection device. Similarly, as used in this specification, the term "light" refers to any suitable electromagnetic radiation in any wavelength and is not necessarily limited to visible light.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims.

Although the present invention has been described with reference to digital image sensors and SOC imaging system architecture, it can also be practiced for analog image sensors. For an SOC imaging system with an analog image sensor, the system may also need to include one or more analog-to-digital converters to convert the analog image signals into digital image data for storage in the memory.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. An imaging system comprising an image sensor, a memory, and a processor, wherein:
   the image sensor is configured to generate image signals corresponding to an image of a scene;
   the processor is configured to control operations of the imaging system in one or more operating modes enabled by one or more configurations accessible by the processor; and
   the memory is configured to store the one or more configurations accessed by the processor to control the operations of the imaging system, wherein the imaging system further comprises interface pins, wherein a voltage pattern applied to the interface pins determines which of the one or more configurations is accessed by the processor.

2. The invention of claim 1, wherein:
   the image sensor, the memory, and the processor are implemented as an SOC in a single integrated circuit;
   the image sensor is a digital pixel sensor that generates digital image signals for storage in the memory; and
   the memory is further configured to store image data corresponding to the image signals.

3. The invention of claim 1, wherein the one or more configurations are stored in the imaging system.

4. The invention of claim 1, wherein the processor is configured to access at least one of the configurations from an external source.

5. The invention of claim 4, wherein the imaging system is configured to add from the external source new software corresponding to a new operating mode.

6. The invention of claim 1, wherein the imaging system is configured to operate in a still camera mode and a video camera mode.

7. The invention of claim 6, wherein the imaging system is further configured to operate in a troubleshooting operating mode.

8. A method for fabricating an imaging system comprising the steps of:
   (a) forming an image sensor;
   (b) forming a memory; and
   (c) forming a processor, wherein:
   the image sensor is configured to generate image signals corresponding to an image of a scene;
   the processor is configured to control operations of the imaging system in one or more operating modes enabled by one or more configurations accessible by the processor; and
   the memory is configured to store the one or more configurations accessed by the processor to control the operations of the imaging system, wherein the imaging system further comprises interface pins, wherein a voltage pattern applied to the interface pins determines which of the one or more configurations is accessed by the processor.

9. The invention of claim 8, wherein:
   the image sensor, the memory, and the processor are implemented as an SOC in a single integrated circuit;
   the image sensor is a digital pixel sensor that generates digital image signals for storage in the memory; and
   the memory is further configured to store image data corresponding to the image signals.

10. The invention of claim 8, wherein the one or more configurations are stored in the imaging system.

11. The invention of claim 8, wherein the processor is configured to access at least one of the configurations from an external source.

12. The invention of claim 8, wherein the imaging system is configured to operate in a still camera mode and a video camera mode.

13. A method of operating an imaging system, the imaging system comprising an image sensor, a memory, a processor, and interface pins, the method comprising the steps of:
   (1) applying a voltage pattern to the interface pins; and
   (2) accessing a configuration corresponding to the voltage pattern, wherein:
   the image sensor is configured to generate image signals corresponding to an image of a scene;
   the processor is configured to control operations of the imaging system in one or more operating modes, wherein the accessed configuration enables at least one of the operating modes; and
   the memory is configured to store one or more configurations accessible by the processor.

14. The invention of claim 13, wherein the voltage pattern applied in step (1) corresponds to logical "0" and logical "1" values.

15. The invention of claim 13, wherein the configuration accessed in step (2) is stored in the imaging system.

16. The invention of claim 13, wherein step (2) comprises the step of accessing the configuration from an external source.

17. The invention of claim 16, wherein step (2) further comprises the step of receiving the configuration from the external source for storage in the imaging system.

18. The invention of claim 13, further comprising the steps of:
   (3) applying different voltage pattern to the interface pins; and
   (4) changing operating mode.

* * * * *